UNITED STATES PATENT OFFICE.

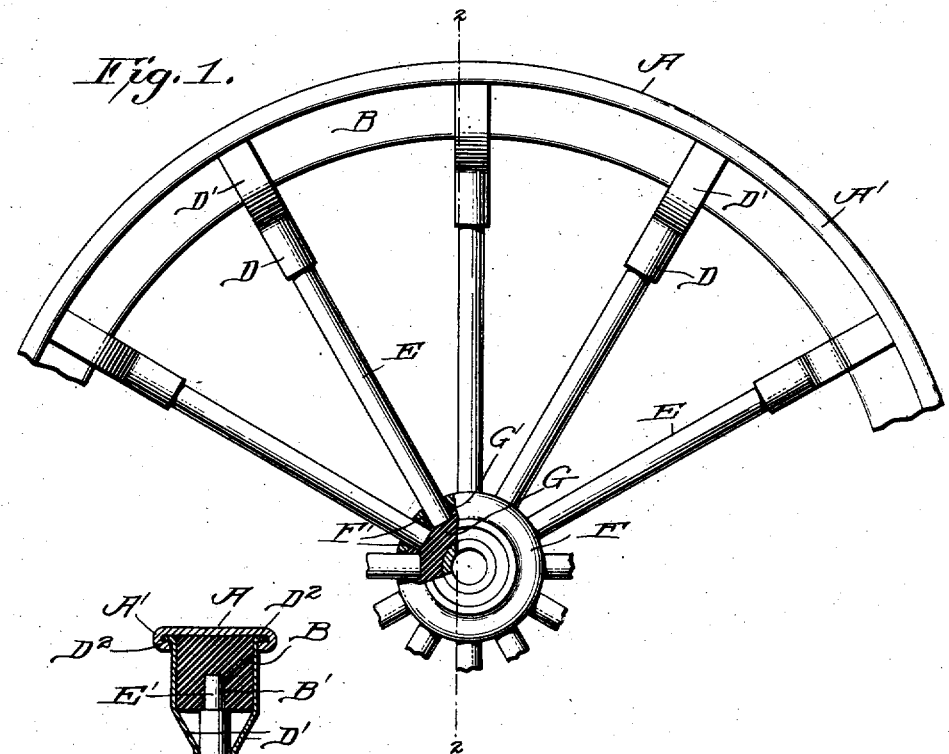
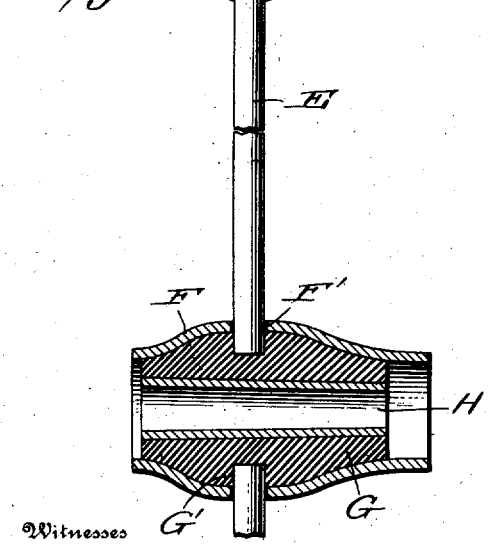
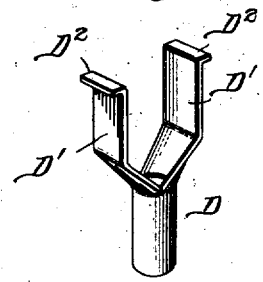

NICHOLAS H. RANKIN, OF PAULINE, NEBRASKA.

WHEEL.

989,190.

Specification of Letters Patent.

Patented Apr. 11, 1911.

Application filed June 26, 1909. Serial No. 504,544.

*To all whom it may concern:*

Be it known that I, NICHOLAS H. RANKIN, a citizen of the United States, residing at Pauline, in the county of Adams and State of Nebraska, have invented a new and useful Improvement in Wheels, of which the following is a specification.

This invention relates to wheels especially adapted to be used on light vehicles, the object being to provide a resilient wheel which is so constructed that the resilient material will be protected whereby the life of the same is increased.

A still further object of the invention is to provide a wheel with a rubber hub and a rubber felly in which the respective ends of the spokes are secured so as to allow the wheel to give when traveling over rough roads.

Another object of the invention is to provide spoke holding members for holding the spokes in their proper positions, said members also serving to hold the rubber felly in its proper position.

A still further object of the invention is to provide a wheel which is exceedingly simple and cheap in construction and one in which the parts are so arranged and secured together that a very strong and durable wheel is formed.

With these objects in view my invention consists of the novel features of construction, combination and arrangement of parts hereinafter fully described, pointed out in the claims and shown in the accompanying drawings, in which, Figure 1 is a side elevation of a portion of a wheel constructed in accordance with my invention, the hub being partly broken away to show the manner of securing the spokes therein. Fig. 2 is a section taken on line 2—2 of Fig. 1. Fig. 3 is a perspective view of the spoke holding members.

In carrying out my improved invention I employ a metallic rim A having hooked flanges A′ between which is adapted to be secured a rubber felly B which is held in position by spoke holding members D adapted to be arranged over each of the spoke sockets B′ of the felly B, said spoke holding members comprising sleeves having integral parallel arms D′ provided with angled ends D² adapted to fit under the hooked edges of the rim A and be held therein by the resiliency of the rubber felly B which bears against the inner faces of the arms D′ so as to hold the arms apart and it will be seen that the spoke holding members D also hold the felly in its proper position. In placing the felly in the spoke members in position in the rim, the felly is put under pressure so as to allow the angled ends to be inserted under the hooked flanges of the rim and when the pressure is removed the felly and spoke holding members will be securely locked to the rim by the expansion of the rubber felly.

Extending through the sleeve portions of the holding members D are spokes E provided with tenons E′ on their outer ends adapted to fit within the spoke sockets B′ of the felly B, the spokes working loosely through the sleeves of the holding members. The other ends of the spokes extend through openings F′ formed in a metal shell F in which is secured a rubber hub G provided with spoke sockets G′ in which the ends of the respective spokes fit and it will be seen that by this arrangement the wheel is allowed to give when an obstruction is brought into engagement with the same, as the spokes work loosely through the openings F′ of the shell F. The hub is provided with the ordinary boxing H adapted to receive the ordinary axle spindle and in placing the rubber hub G within the shell F pressure is applied to the same so that after it has been forced into the shell the expansion of the rubber will hold the same in its proper position and after the boxing has been inserted in the bore of the hub it will be impossible for the hub to move.

From the foregoing description it will be seen that I have provided a vehicle wheel with a rubber hub and a rubber felly in which the respective ends of the spokes are mounted whereby a very elastic wheel is formed in which the elastic material is protected so that the life of the same is greatly increased without decreasing the elasticity of the wheel.

What I claim is:—

1. A vehicle wheel comprising a rim having hooked edges, an elastic felly arranged on said rim between said edges provided with spoke sockets, spoke holding members provided with angled arms secured under the hooked edges of said rim by said felly, spokes extending through said holding members into said sockets and an elastic hub in which the other ends of said spokes are adapted to be secured.

2. A wheel comprising a metal rim carrying an elastic felly, spoke holding members carried by said rim, spokes extending through said holding members into said felly, and an elastic hub surrounded by a metal shell provided with spoke sockets into which the ends of the spokes are adapted to fit.

3. A wheel comprising a rubber hub surrounded by a shell, spokes mounted in said hub, a rim carrying a rubber felly provided with spoke sockets to receive the ends of said spokes, said metal rim being provided with hooked edges and spoke holding members comprising sleeves adapted to fit loosely over said spokes, said sleeves being provided with integrally spaced arms terminating in angled ends adapted to be held under the hooked edges of said rim by said felly.

NICHOLAS H. RANKIN.

Witnesses:
R. L. WOODS,
PARKER ANDERSON.

Copies of this patent may be obtained for five cents each, by addressing the "Commissioner of Patents, Washington, D. C."